US008387773B2

(12) United States Patent
Fahldieck

(10) Patent No.: US 8,387,773 B2
(45) Date of Patent: Mar. 5, 2013

(54) CLIP FOR CAPTURING BOTTLE NECKS, PARTICULARLY OF PET BOTTLES

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 135 days.

(21) Appl. No.: 13/060,471

(22) PCT Filed: Sep. 24, 2009

(86) PCT No.: PCT/EP2009/006895

§ 371 (c)(1),
(2), (4) Date: Feb. 24, 2011

(87) PCT Pub. No.: WO2010/060499

PCT Pub. Date: Jun. 3, 2010

(65) Prior Publication Data

US 2011/0147166 A1 Jun. 23, 2011

(30) Foreign Application Priority Data

Nov. 3, 2008 (DE) ......................... 10 2008 055 618

(51) Int. Cl.
*B65G 15/00* (2006.01)

(52) U.S. Cl. ................................ 198/472.1; 198/867.04

(58) Field of Classification Search ............... 198/460.2, 198/468.5, 470.1, 472.1, 478.1, 867.04, 803.6
See application file for complete search history.

(56) References Cited

U.S. PATENT DOCUMENTS

| | | | | |
|---|---|---|---|---|
| 4,968,081 | A * | 11/1990 | Beight et al. | 198/470.1 |
| 4,995,501 | A * | 2/1991 | Lundstrom et al. | 198/468.2 |
| 6,758,907 | B2 * | 7/2004 | Kampmann | 198/470.1 |
| 7,784,603 | B2 * | 8/2010 | Burgmeier | 198/472.1 |

FOREIGN PATENT DOCUMENTS

| | | |
|---|---|---|
| DE | 202005002924 | 3/2006 |
| DE | 102005014838 | 10/2006 |
| DE | 102005041929 | 3/2007 |
| DE | 102006012020 | 9/2007 |
| EP | 1375395 | 1/2004 |
| EP | 1868746 | 12/2007 |
| WO | 2007/104503 | 9/2007 |

* cited by examiner

*Primary Examiner* — James R Bidwell
(74) *Attorney, Agent, or Firm* — Occhiuti Rohlicek & Tsao LLP

(57) ABSTRACT

An apparatus for capturing bottle necks in bottle filling installations includes a clip having clip arms. The clip arms are pivotable in a horizontal plane and mounted so as to be jointly pivotable in a horizontal plane about a pivot axis. The apparatus also includes an attachment for a magnet, and another magnet provided with the attachment and disposed on a side of the attachment such that the pivot axis is between the magnet and the clip arms, and a clip holding block configured to be secured onto a star and facing the clip and having a magnet. The magnet on the attachment and the magnet on the clip holding block are essentially opposite and spaced apart from each other by a distance that ensures horizontal pivoting movements of the clip.

10 Claims, 5 Drawing Sheets

A-A

A-A

CLIP FOR CAPTURING BOTTLE NECKS, PARTICULARLY OF PET BOTTLES

CROSS-REFERENCE TO RELATED APPLICATIONS

This application is the National Stage of International Application No. PCT/EP2009/006895, filed on Sept. 24, 2009, which claims the priority of German Patent Application No. 10 2008 055 618.1, filed on Nov. 3, 2008. The contents of both applications are hereby incorporated by reference in their entirety.

FIELD OF INVENTION

The invention relates to a clip for capturing bottle necks, in particular of PET bottles, in bottle filling installations, wherein the clip arms are pivotable in the horizontal plane.

BACKGROUND

There are very different developments of these types of clips. Thus, for example, DE 10 2006 012 020 shows a pair of clips, the two clip arms being pivotable into non-separated axes and the closing force being held in the closing position by means of a spring. As these types of spring elements frequently do not meet the demands for hygiene required in bottle filling installations, efforts are made to propose other closing mechanisms. Thus, in an expensive development, DE 10 2005 041 929 provides permanent magnets that support both the closing and the opening in different pairings. In this solution the permanent magnets are positioned outside the clip grabbing arms.

To support the opening force of the clips, one solution according to DE 20 2005 002 924 U or DE 10 2005 014 838 A provides that repelling magnets are positioned between the grabbing region of the clips and pivotal axes. In the case of these kinds of clips, there is a certain requirement for lateral yielding, as the participating elements are frequently driven by way of servo motors that do not always run in a precisely synchronous manner. This means that there can be a small misalignment, for example between a transfer star, a filling machine or the like. Small reference circles produce curve-shaped paths for the bottle into the grabbing means, wear and tear on the grabbing means and the transfer being improved by means of lateral flexibility.

SUMMARY

It is the object of the present invention to make it possible for the clips or grabbing means to yield in a lateral manner, at the same time ensuring immediate resetting into the required position, e.g. a transfer start or the like.

In the case of a clip of the aforementioned type, this object is achieved according to the invention in that the clip arms are mounted so as to be jointly pivotable in a horizontal manner about a pivot axis, wherein an attachment provided with at least one magnet is provided on the side lying opposite the clip arms with reference to the pivot axis, and wherein a clip holding block secured to a star or the like is provided on its side facing the clip with at least one magnet, wherein the magnets that are essentially opposite each other are spaced apart from each other by a distance that ensures the horizontal pivoting movements of the clip.

The provision of magnets for determining the position or for retaining the required position of the clips, at the same time with a possibility of yielding laterally, offers a range of advantages. There is no requirement for springs or the like which are often not desired on account of the fact that cleaning them involves problems. The clip according to the invention does not have this problem.

Developments of the invention are produced from the sub claims.

Thus it can be provided that the clip holding block is provided with two same directional magnets that are located spaced apart.

One particular development of the invention consists in that the central axis through the magnets in the clip holding block on the one side and in the attachment of the pivotable clips are spaced apart vertically one relative to the other in such a manner that the pair of clips is held on its pivot shaft against the direction of gravity.

The particular advantage of this development is that, for example, a simple replacement of the clips can be undertaken without any tool as the clip or the clamp only has to be pulled downward against the resistance of the magnets. It is also ensured that the clips are not inserted the wrong way round by mistake as then the magnets repel.

For inserting the clip, said clip is guided upward until the magnet resistance is overcome. After this the magnetic forces hold upward and thus hold the clip or clamp in a fixed manner.

The additional advantage of this fastening is that the clip can yield slightly in its height against the force of the magnets and after a deflection is pulled upward again by the magnets.

This advantage applies in the same way to the resilient yielding of the clip in the horizontal or lateral direction.

The invention also provides that the clip with the clip arms, the pivot bearing of the clip and the attachment for a permanent magnet as well as the associated clip holding block with the magnet accommodating means is produced from plastics material, wherein the permanent magnets are cast into the plastic material.

It is particularly expedient if the clip with the clip arms, the pivot bearing of the clip and the attachment for a permanent magnet are realized as one plastics material element. Said one-piece development makes the production extremely simple and economical. The possibility of casting the magnet into the plastics material additionally offers its total encapsulation and consequently simplifies the cleaning of said system elements.

The invention also provides that the permanent magnet in the attachment of the clip and the two permanent magnets in the clip holding region are aligned one relative to another with identical poles to exert a centering force.

A further advantage of the invention is that, for example, it is not possible to insert the clips the wrong way round, that is to say they can only be held by the magnets in a corresponding arrangement, thereby in this case avoiding inaudible snapping-in, for instance of spring tensions according to the prior art.

The arrangement of the magnets can be different depending on the way in which they are being used. Thus it is possible to provide an eccentrically arranged magnet just for securing the height along with the respective magnet in the attachment of the clip in the holding block.

Depending on the alignment of the magnet, said magnet can be used centrally and in an attractive manner both for fixing the height and also for centring the clip, whereas with one magnet in the clip and two eccentrically repelling magnets in the holding block, height securement of the clip is achievable along with radial centering.

In a modified exemplary embodiment, it is also provided according to the invention that the clip has permanent magnets in the region of the pivot axis and wherein a holding block secured to a star or the like has an attachment or the like positioned above the pivoting region of the clip arms, said attachment or the like being provided on its side facing the clip with at least one magnet, wherein the magnets that are situated essentially opposite each other are spaced apart by a distance that ensures the horizontal pivoting movement.

If, according to the first exemplary embodiment of the invention, the interacting permanent magnets are essentially situated one relative to the other in a horizontal plane, the misalignment of the magnets for applying the holding force is firstly disregarded, thus in the case of this exemplary embodiment of the invention the magnets effecting the centering or holding force are essentially situated vertically one above the other.

As already mentioned in the case of the preceding exemplary embodiments, the positioning and the polar alignment of the magnets is also adapted to the respective installation situations and sizes of the elements that are necessary for centering or holding purposes.

In the case of a further exemplary embodiment according to the invention, one development provides that the individually pivotable clip arms are provided in their pivoting region effectively with a magnet holding disc, wherein the magnet holding disc corresponds with an assembly element provided with permanent magnets in such a manner that a resetting force is exerted onto the clip arms through the permanent magnets in the magnet holding disc on the one side and the permanent magnets in the assembly element on the other side.

BRIEF DESCRIPTION OF THE DRAWINGS

The invention is explained below by way of the drawing, in which, in detail.

DETAILED DESCRIPTION

The clip, given the general reference 1, is mounted on a clip holding block 2 so as to be pivotable in an easily rotating manner about an axis 3 and is produced in one piece from plastics material.

Figure 4:
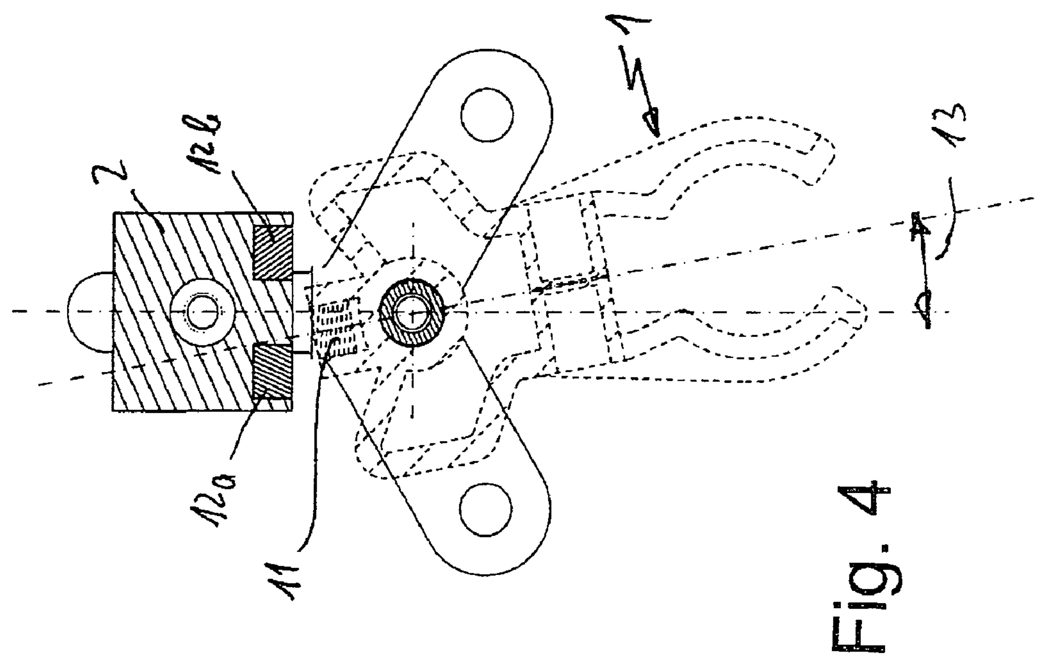

The clip design, in this case, as can be seen, for example in FIG. 4, is as follows:

The clip 1 has two clip arms 1*a* and 1*b*. In this case, two clip stirrup regions 5, which are lozenge-shaped when seen in top view and merge into accommodating means 6, extend in a mirror symmetrical manner from a ring-shaped region that forms the axis and surrounds the pivot axis 3, in the form of a sleeve, given the reference 4 in FIG. 1. Permanent magnets 7, which are arranged with opposing poles, are cast in said accommodating means 6 in such a manner that a closing force of the clip is applied. The capturing regions or capturing clamps of the clip 1, given the reference 8, are integrally moulded on said accommodating means of the permanent magnets.

An attachment 10 for accommodating a permanent magnet 11 is provided integrally on the clip 1 on the side of the clip arms 1*a*, 1*b* located opposite with reference to the pivot axis 3.

Figure 2:
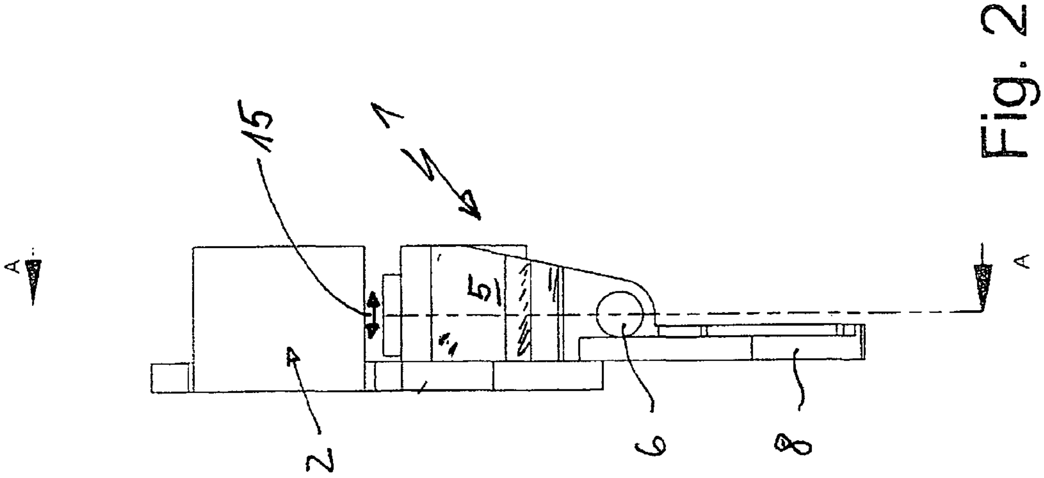
FIG. 2 shows a side view of the clip.
Figure 1:
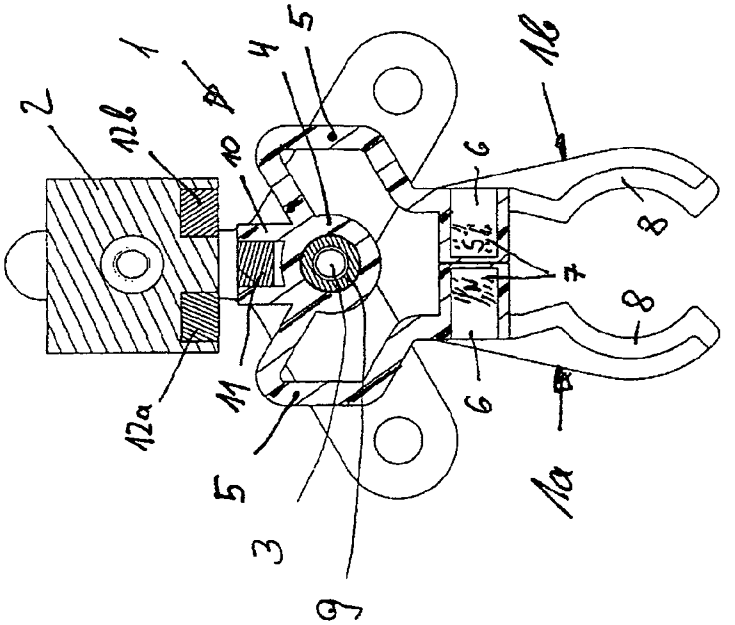
FIG. 1 shows a top view, in partial section, of a clip with holder along the line A-A.
Figure 3:
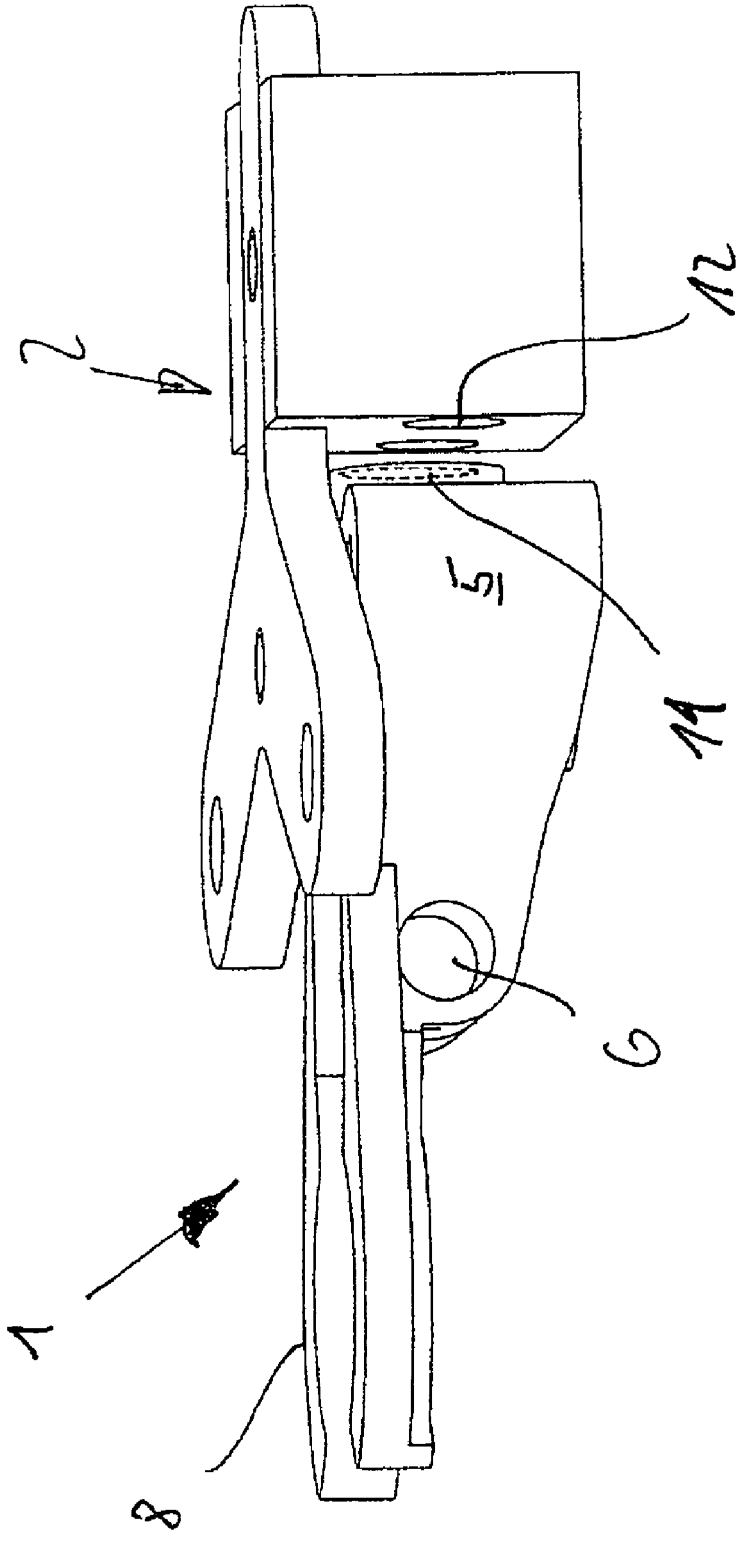
FIG. 3 shows a three-dimensional side view of the clip in FIGS. 1 and 2, FIGS. 4 and 5 show top views of the clip with different positions outside centricity.

The clip holding block 2, as can be seen, for example, in FIG. 2, is provided with permanent magnets 12*a* and 12*b*, which are facing the magnet 11 of the clip 1 and are polarized such that they hold the clip 1 in the positions represented in FIG. 1.

Figure 5:
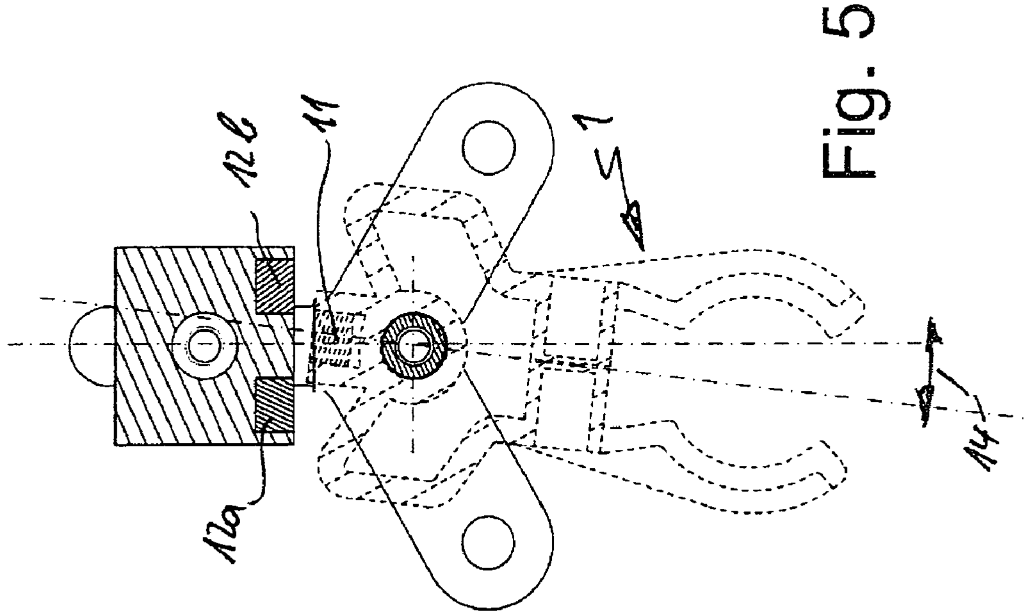

The clip 1 is shown with dotted lines in FIGS. 4 and 5 in positions that it can assume, for example, whenever synchronicity of the interacting machine part is not held precisely for a discharge or transfer of the bottle. The clip is pulled back into the starting position by means of the magnets 11 and 12, which is indicated in FIGS. 4 and 5 by the double arrows 13 and 14.

One characteristic of the invention is that the position of the magnets 11 and 12 one to another is selected such that the clip is pulled upward and consequently held in the position of use, which is indicated in FIG. 2 by a small double arrow 15.

Figure 6:
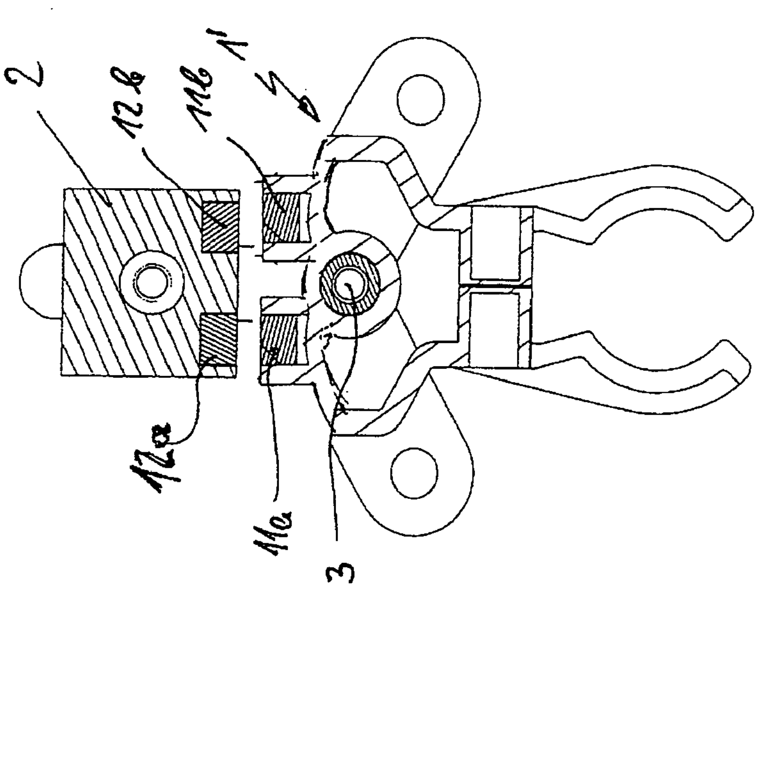
FIG. 6 shows a modified exemplary embodiment of the clip in the representation of FIG. 1.

FIG. 6 shows a modified exemplary embodiment of the invention in the representation as in FIG. 1, the elements having the identical effect also being provided with the identical reference.

Contrary to the exemplary embodiment in FIG. 1, in the exemplary embodiment in FIG. 6 the one piece clip 1' is provided with two permanent magnets 11*a* and 11*b*, which point to the clip holding block 2 and are essentially situated opposite the two permanent magnets 12*a* and 12*b* in the clip holding block 2 unless with the misalignment already addressed above in order to be able to exert a force holding the clip 1' upward.

Figure 7:
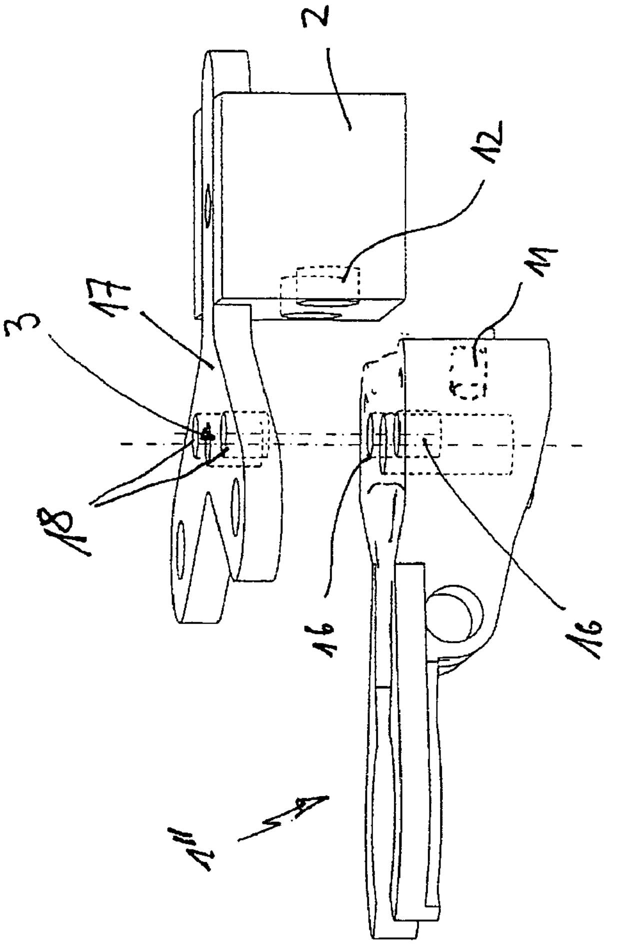
FIG. 7 shows a three-dimensional exploded drawing of a further exemplary embodiment.

FIG. 7 shows a further modified exemplary embodiment of the invention. In this case, upwardly pointing permanent magnets 16 are provided in place of or in addition to the magnets 11 on the clip 14, two oppositely situated permanent magnets 18, in this case pointing downwards, being provided on the holding block 2 at one end of the attachment 17 covering the clip in the position of use. Depending on the polarization, this pair of permanent magnets 16/18 can adjust both the horizontal position of the clip 1" and, where they have deflected, in each case pivot back into the initial position. At the same time, however, they can also apply the corresponding clip holding force in order to hold the clip in position.

It must be noted at this point that the holding force of the magnet effecting the positioning of the clips 1, 1' and 1"" is so great that the clips can also capture, for example, several PET bottles and are able to convey said bottles further without the clips losing their hold on the star.

Figure 9:
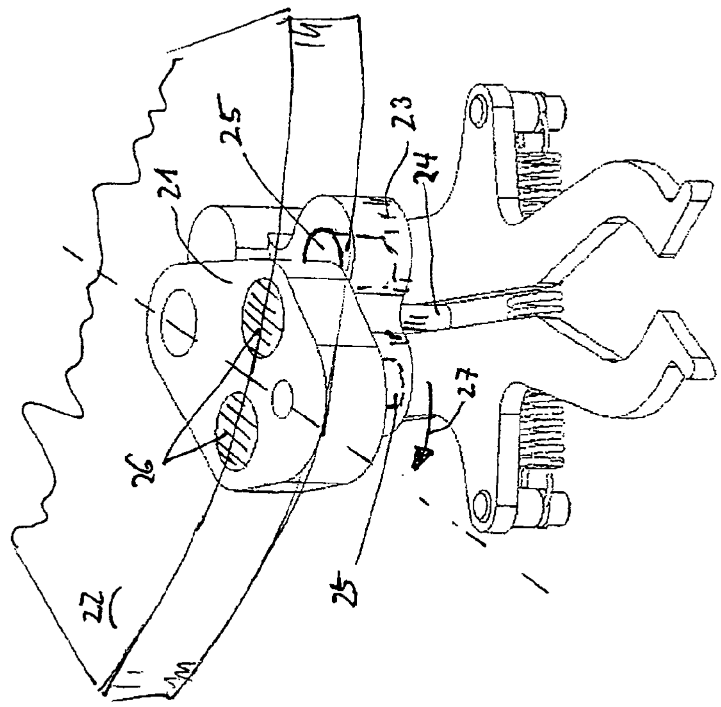
FIGS. 8 and 9 show three-dimensional representations of another exemplary embodiment in two different positions of the clip.
Figure 8:
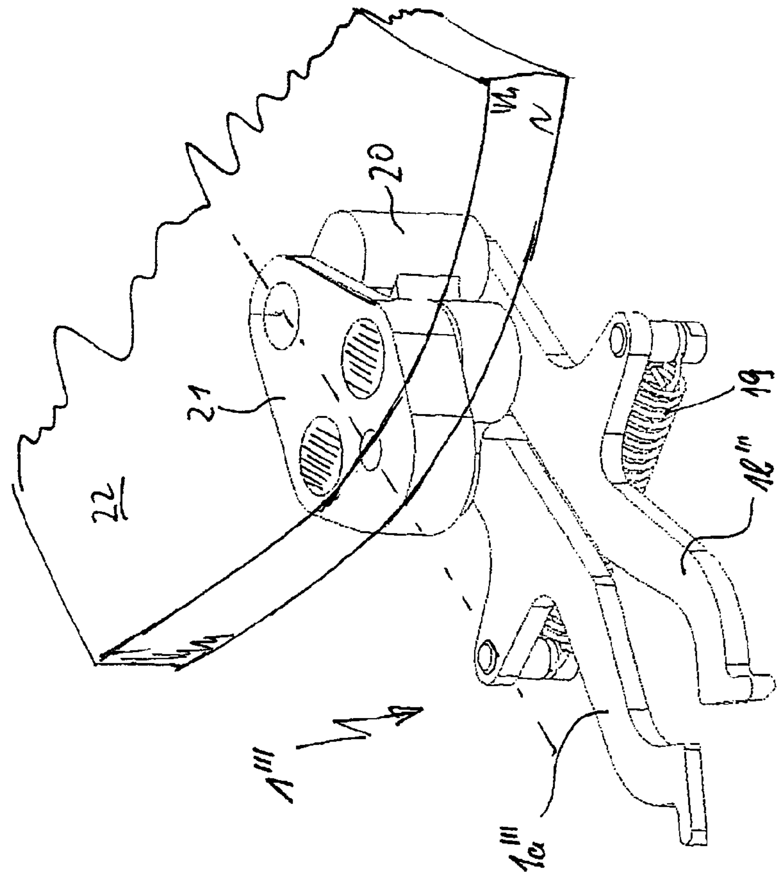

FIGS. 9 and 8 show a further exemplary embodiment of the invention for centering a clip, given the general reference 1'''. The two clip arms 1*a'''* and 1*b'''*, in this case, are rotatably mounted against the force of a spring 19 in a bearing block 20 by means of an assembly element 21 on a star 22 that is just indicated in FIGS. 8 and 9. Between the surface of the clip 1*a'''* and 1*b'''* there is positioned a magnet holding disc 23, which engages between the clips by way of a pin 24. Permanent magnets 25, aligned in the vertical direction, are positioned in the magnet holding disc 23, corresponding permanent magnets 26 being admitted in the assembly element 20 in such a manner that they can exert a resetting force in accordance with arrow 27 in FIG. 9.

Naturally, it is possible to modify the described exemplary embodiment of the invention in many respects without departing from the basic concept. Thus, the geometric development of the clip 1 can be selected differently, also the closing magnets 6 described here do not, where applicable, have to be provided in the position represented in the drawings, but can be provided in another position and such like.

The invention claimed is:

1. An apparatus for capturing bottle necks in bottle filling installations, said apparatus comprising: a clip having clip arms, said clip arms being pivotable in a horizontal plane and mounted so as to be jointly pivotable in a horizontal plane about a pivot axis, an attachment for at least one magnet, and at least one magnet provided with the attachment, said magnet being disposed on a side of the attachment such that the pivot axis is between said magnet and the clip arms, and a clip holding block configured to be secured onto a star and facing the clip, said clip holding block having at least one magnet, wherein the magnet on the attachment and the magnet on the clip holding block are essentially opposite each other and are spaced apart from each other by a distance that ensures horizontal pivoting movements of the clip.

2. The apparatus of claim 1, wherein the clip holding block has two magnets spaced apart from each other, and oriented in the same direction.

3. The apparatus of claim 1, wherein the at least one magnet in the clip holding block and the at least one magnet in the attachment are spaced apart vertically relative to each other in such a manner that the magnets cooperate to exert a force holding the clip on its pivot shaft against the direction of gravity.

4. The apparatus of claim 1, wherein the clip arms, a pivot bearing of the clip, the attachment, and the associated clip holding block are produced from plastics material, and wherein the magnets are embedded in the plastics material.

5. The apparatus of claim 1, wherein the clip arms, a pivot bearing of the clip, and the attachment are realized as one plastics material element.

6. The apparatus of claim 2, wherein the magnet in the attachment and the two magnets in the clip holding block are aligned relative to each other with identical poles to exert a centering force.

7. An apparatus for capturing bottle necks in bottle filling installations, said apparatus comprising: a clip having clip arms that are pivotable in a horizontal plane, at least one permanent magnet in a region of a pivot axis, and a holding block configured to be secured to a star, the holding block including an attachment positioned above a pivoting region of the clip arms, said attachment having a side facing the clip, and being provided on said side with at least one magnet, wherein the at least one magnet on the clip and the at least one magnet on the attachment are situated essentially opposite each other and are spaced apart by a distance that ensures horizontal pivoting movement of the clip arms.

8. The apparatus of claim 7, wherein the at least one magnet in the clip holding block and the at least one magnet in the pivoting region of the clip are spaced apart vertically in such a manner that the clip is held on a pivot shaft against the direction of gravity.

9. The apparatus of claim 7, wherein the clip arms are individually pivotable clip arms, the apparatus further comprising, in the pivoting region, a magnet holding disc that corresponds with an assembly element, and permanent magnets associated with the magnet holding disc, the permanent magnets being disposed to cooperate with permanent magnets in an assembly element to exert a resetting force on the clip arms, the permanent magnets in the magnet holding disc and the permanent magnets in the assembly element being disposed to be urged opposite to each other.

10. A method for conveying containers, said method comprising providing at least one drivable conveying device having a plurality of clips located on an outside edge thereof, each of said clips having clip arms, said clip arms being pivotable in a horizontal plane and mounted so as to be jointly pivotable in a horizontal plane about a pivot axis, an attachment for a magnet, and at least one magnet provided with the attachment, said magnet being disposed on a side of the attachment such that the pivot axis is between said magnet and the clip arms, and a clip holding block configured to be secured onto a star and facing the clip, said clip holding block having at least one magnet, wherein the magnet on the attachment and the magnet on the clip holding block are essentially opposite each other and are spaced apart from each other by a distance that ensures horizontal pivoting movements of the clip, and capturing a neck of a container conveyed by said conveying device between a pair of said clip arms.

* * * * *